(12) United States Patent
Ordo

(10) Patent No.: US 12,162,443 B2
(45) Date of Patent: Dec. 10, 2024

(54) VEHICLE WASH SYSTEM

(71) Applicant: James Patrick Ordo, Avon, IN (US)

(72) Inventor: James Patrick Ordo, Avon, IN (US)

( * ) Notice: Subject to any disclaimer, the term of this patent is extended or adjusted under 35 U.S.C. 154(b) by 591 days.

(21) Appl. No.: 17/244,360

(22) Filed: Apr. 29, 2021

(65) Prior Publication Data

US 2021/0339714 A1  Nov. 4, 2021

Related U.S. Application Data

(60) Provisional application No. 63/017,337, filed on Apr. 29, 2020.

(51) Int. Cl.
| | | |
|---|---|---|
| *B60S 3/04* | (2006.01) | |
| *B60S 3/00* | (2006.01) | |
| *C02F 1/00* | (2023.01) | |
| *C02F 1/74* | (2023.01) | |
| *C02F 103/44* | (2006.01) | |

(52) U.S. Cl.
CPC ............... *B60S 3/04* (2013.01); *B60S 3/004* (2013.01); *C02F 1/001* (2013.01); *C02F 1/74* (2013.01); *C02F 2103/44* (2013.01); *C02F 2303/02* (2013.01); *C02F 2303/16* (2013.01)

(58) Field of Classification Search
None
See application file for complete search history.

(56) References Cited

U.S. PATENT DOCUMENTS

| | | | |
|---|---|---|---|
| 3,774,625 A | | 11/1973 | Wiltrout |
| 5,803,982 A | * | 9/1998 | Kosofsky .................. B08B 3/08 134/182 |
| 5,908,550 A | | 6/1999 | Kaipainen |
| 6,042,730 A | * | 3/2000 | Lahti ......................... C02F 1/58 210/667 |
| 2019/0100446 A1 | * | 4/2019 | DeChard ................... B08B 3/14 |

FOREIGN PATENT DOCUMENTS

WO  WO-9321045 A1 * 10/1993  ................ B60S 3/04

OTHER PUBLICATIONS

EP 1927521 A2 translation, Device And Method For Reducing Unpleasant Smells In Vehicle Washing Installations, Lenz (Year: 2008).*
Sonny's the Carwash Factory; Water Reclaim & Odor Control System, flyer, water reclaim and odor control system device with features and product data.
EC Express Carwash; Express Carwash Reclaim System, manual, general manual on the system, installation of the system, and operating instructions.
Purwater Water Recovery Systems Newwave Industries; Reclaim 2.0 Manual, manual, general manual on the system, installation of the system, and operating instructions.

* cited by examiner

*Primary Examiner* — Cristi J Tate-Sims

(57) ABSTRACT

A vehicle wash system is provided that includes an oxidizer system and a filter system.

27 Claims, 8 Drawing Sheets

VEHICLE WASH SYSTEM

RELATED APPLICATIONS

This application claims the benefit of U.S. Provisional Patent Application No. 63/017,337, filed Apr. 29, 2020, the entire disclosure of which is expressly incorporated by reference herein.

TECHNICAL FIELD

The present disclosure generally relates to a vehicle wash system. More particularly, the present disclosure relates to a vehicle wash system including a reclamation loop, a filtration system, and an oxidizer system.

BACKGROUND AND SUMMARY OF THE DISCLOSURE

This section introduces aspects that may help facilitate a better understanding of the disclosure. Accordingly, these statements are to be read in this light and are not to be understood as admissions about what is or is not prior art.

There are over 17,000 conveyor-type vehicle wash systems in the U.S. market alone. Current vehicle wash systems use about 45 gallons per car. However, using a liquid reclamation system, a vehicle wash system can save 10-20 gallons of water per car based on the 45 gallon per car usage. Some vehicle wash systems use liquid reclamation systems to collect liquid used to wash vehicle and recycle the liquid by removing cleaning chemicals and material such as dirt, oil, leaves, paper and other organic materials. While collecting, filtering, sanitizing, and storing the liquid in the liquid reclamation system, this liquid can turn anaerobic, causing unpleasant smells, and can remain too turbid, clogging nozzles or damaging pumps.

According to the present disclosure, a vehicle wash system is provided that includes at least one of a filtration system and an oxidizer system. The filtration system removes material from the liquid. The oxidizer system introduces an oxidizer into the liquid.

According to one aspect of the present disclosure, a vehicle wash system is provided that includes a filtration system that removes neutrally buoyant material from the system. According to another aspect of the present disclosure, the vehicle wash system includes an oxidizer system in fluid communication with the liquids and a media-based filter downstream of the oxidizer system. According to another aspect of the present disclosure, the vehicle wash system includes an adjustable oxidizer system in fluid communication with the liquid and a feedback control loop. According to another aspect of the present disclosure, the vehicle wash system includes at least three tanks, substantially all liquid being directed into the first tank.

According to another aspect of the present disclosure, a vehicle wash system is provided. The vehicle wash system includes a vehicle conveyor configured to advance vehicles, a liquid loop including a plurality of nozzles configured to apply liquids to vehicles advanced past the plurality of nozzles by the vehicle conveyor, a basin positioned to collect liquids applied to the vehicles by the plurality of nozzles, and at least one pump configured to pump liquids to the plurality of nozzles. The at least one pump is configured to pump the liquids from at least one tank positioned to receive the liquids after application to the vehicles by the plurality of nozzles. The vehicle wash system further includes a filtration system positioned to remove neutrally buoyant material from the liquid loop.

According to another aspect of the present disclosure, a vehicle wash system is provided. The vehicle wash system includes a plurality of nozzles configured to apply liquids to vehicles, a vehicle conveyor configured to advance vehicles past the plurality of nozzles, and at least one pump configured to pump liquids to the plurality of nozzles. The at least one pump is configured to pump the liquids from at least one tank positioned to receive the liquids after application to the vehicles by the plurality of nozzles. The vehicle wash system further includes an oxidizer system in fluid communication with the liquids to introduce oxidizer into the liquid and a media-based filter positioned downstream of the oxidizer system to filter material from the liquid.

According to another aspect of the present disclosure, a vehicle wash system is provided. The vehicle wash system includes a plurality of nozzles configured to apply liquids to vehicles, a vehicle conveyor configured to advance vehicles past the plurality of nozzles, and at least one pump configured to pump liquids to the plurality of nozzles. The at least one pump is configured to pump the liquids from at least one tank positioned to receive the liquids after application to the vehicles by the plurality of nozzles. The vehicle wash system further includes an adjustable oxidizer system in fluid communication with the liquids moved by the at least one pump to introduce a metered amount of oxidizer into the liquid. The adjustable oxidizer system includes a feedback control loop having a sensor configured to measure a characteristic indicative of a condition of the liquid. The adjustable oxidizer system adjusts the introduction of oxidizer into the liquids based on the measured characteristic.

According to another aspect of the present disclosure, a vehicle wash system is provided. The vehicle wash system includes a plurality of nozzles configured to apply liquids to vehicles, a vehicle conveyor configured to advance vehicles past the plurality of nozzles, a series positioned to receive the liquids after application to the vehicles by the plurality of nozzles, and at least one pump configured to pump liquids to the plurality of nozzles. The at least one pump is configured to pump the liquids from at least one of the series of tanks. The vehicle wash further includes an oxidizer system in fluid communication with the liquids moved by the at least one pump to introduce oxidizer into the liquids to create oxidized liquid. Substantially all oxidized liquid flows through the first tank of the series of tanks.

BRIEF DESCRIPTION OF THE DRAWINGS

The previously described aspects of this disclosure will grow to be appreciated at a greater level once references to the following accompanying illustrations are expounded upon.

Figure 1:
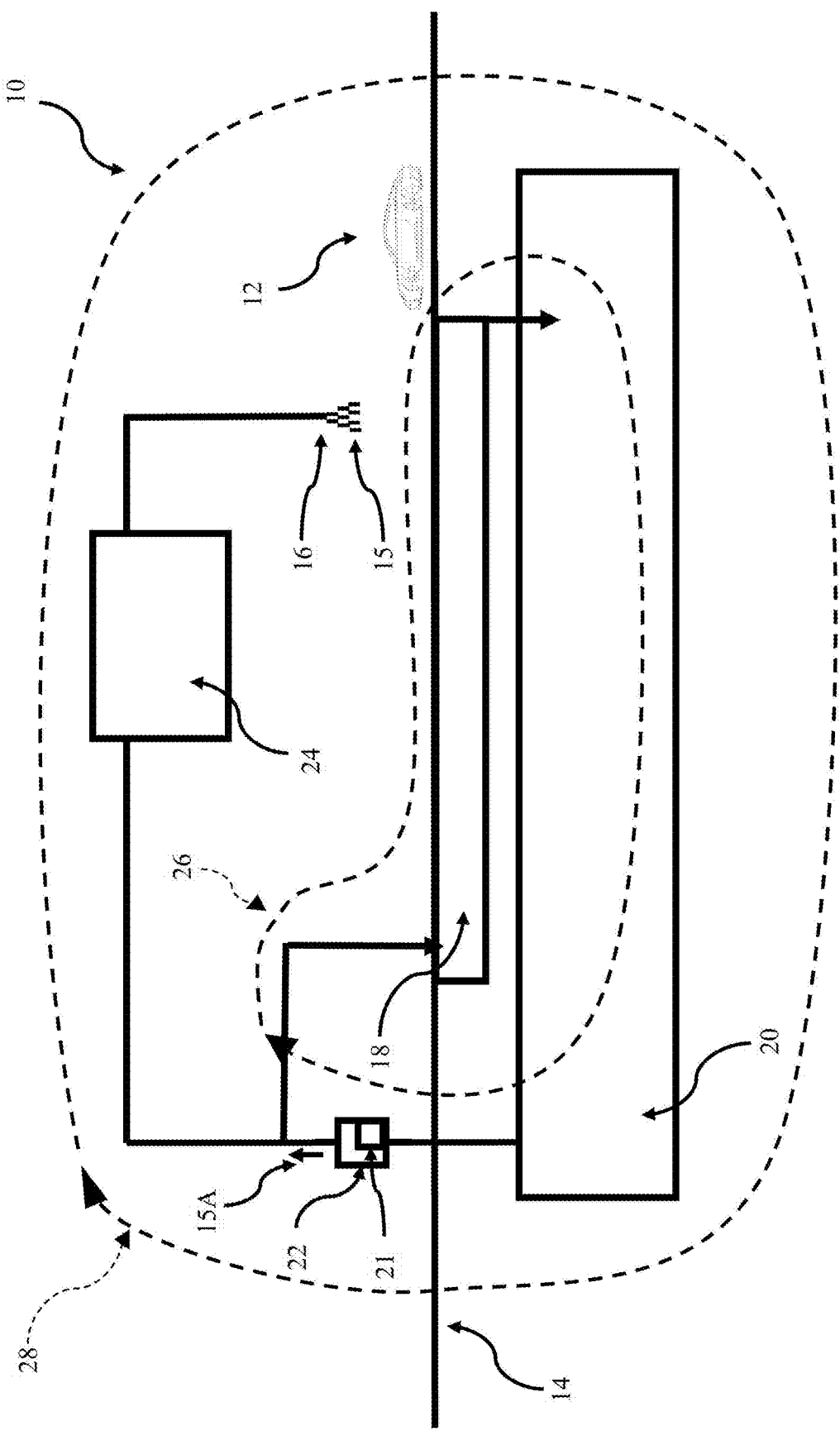
FIG. 1 is a schematic diagram of a vehicle wash system having a vehicle conveyor, a basin positioned under the vehicle conveyor to collected liquid, at least one tank receiving liquid from the basin, an oxidizer system, a recirculation loop including the basis to recirculate water, and a reclamation loop including a filtration system and nozzles.

The embodiments disclosed below are not intended to be exhaustive or limit the disclosure to the precise form disclosed in the following detailed description. Rather, the embodiments are chosen and described so that others skilled in the art may utilize their teachings. Unless otherwise indicated, the components shown in the figures are shown proportional to each other. It will be understood that no limitation of the scope of the disclosure is thereby intended. The disclosure includes any alterations and further modifications in the illustrative devices and described methods and further applications of the principles of the disclosure which would normally occur to one skilled in the art to which the disclosure relates.

DETAILED DESCRIPTION

For the purposes of promoting an understanding of the principles of the present dis closure, reference will now be made to the embodiments illustrated in the drawings, and specific language will be used to describe the same. It will nevertheless be understood that no limitation of the scope of this disclosure is thereby intended.

As shown in FIG. 1, a vehicle wash system 10 is provided to wash vehicles 12. Wash system 10 includes a conveyor system 14 to advance vehicles 12 through wash system 10 and a plurality of nozzles 16 that apply liquids 15 to vehicles 12 as they are advanced past nozzles 16 by conveyor system 14. Additional details of other components suitable for use with wash system 10 and the other wash systems described herein are provided in FIG. 8 and describe herein.

Wash system 10 also includes a basin 18 that collects liquids 15 applied to vehicles 12 and other liquids and materials that fall into or are otherwise collected by basin 18. A series of tanks 20 receive liquids 15 and other materials, such as paper, fibers, etc., collected by basin 18 and a pumped to an oxidation system 22 that introduces one or more oxidizers into liquids 15 to create oxidized liquids 15A.

Oxidizer system 22 may include a feedback control loop having at least one sensor 21. At least one sensor 21 measures a characteristic of liquids 15, such as temperature, dissolved oxygen saturation, pH, etc., and oxidizer system 22 adjusts the introduction of oxidizer into liquids 15 based on the measured characteristic. The one or more oxidizers are introduced to increase the dissolved oxygen in liquids 15 throughout vehicle wash system 10. Measured characteristics of liquids 15 are used by the PLC to adjust the dosing of liquids 15 with oxidizers. Additionally, the PLC may provide warnings if certain characteristics are above or below preferred levels, such as the pH of the liquids going below 6.0 pH, etc.

After leaving oxidation system 22, oxidized liquids 15A is directed to either plurality of nozzles 16 or oxidized liquids 15A bypasses nozzles 16 and is directed to basin 18. Oxidized liquids 15A directed to nozzles 16 passes through a filter 24 to remove materials prior to being applied to vehicles 12 by nozzles 16.

Together, basin 18, series of tanks 20 and oxidizer system 22 cooperate to provide a recirculation loop 26. Similarly, basin 18, series of tanks 20, oxidizer system 22, filter 24, and nozzles 16 cooperate to provide a reclamation loop 28. Components may be added or removed from either loop 26, 28.

Figure 2:
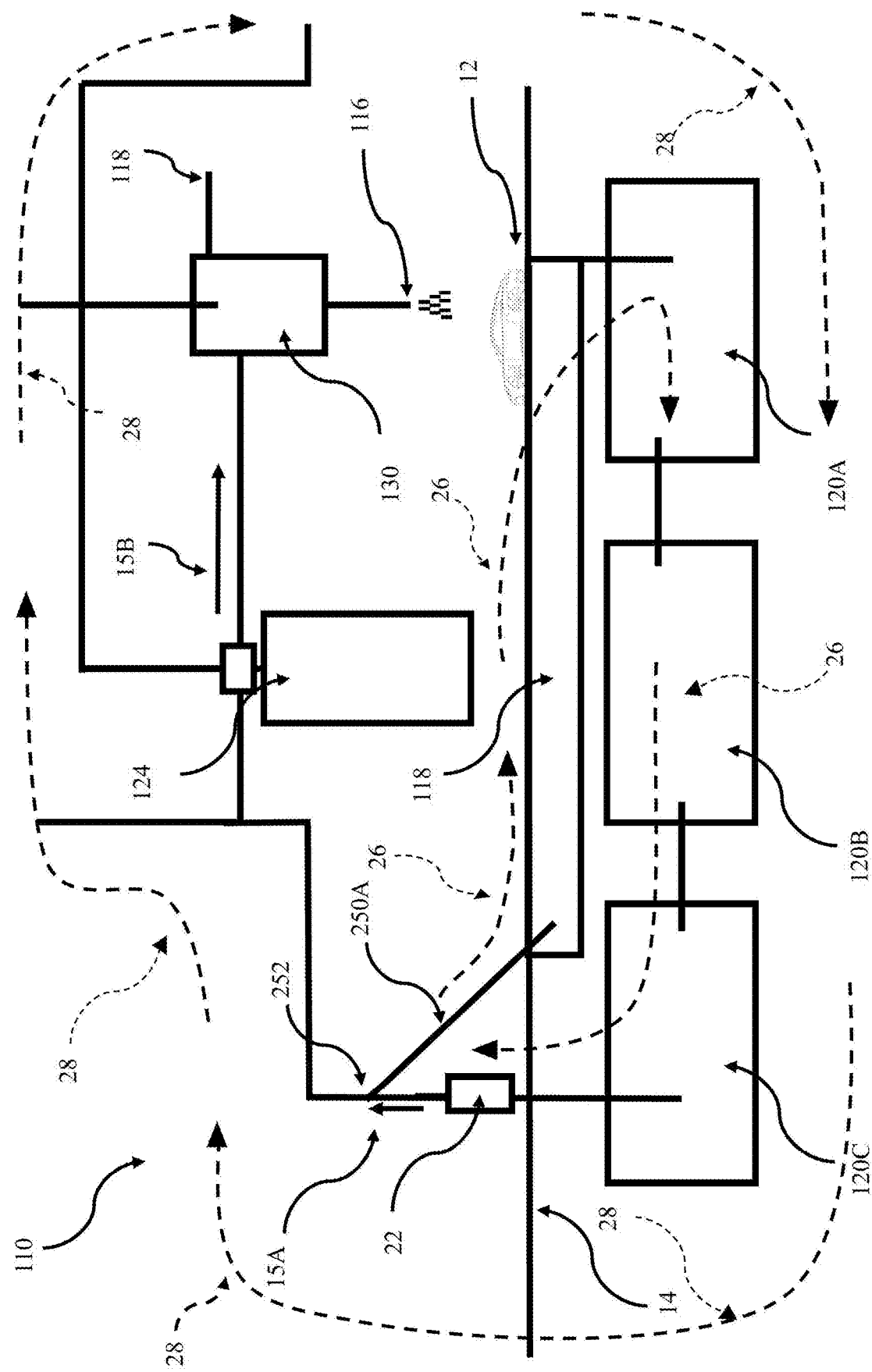
FIG. 2 is the schematic diagram of another vehicle wash system similar to the vehicle wash system of FIG. 1 showing the vehicle wash system with a series of tanks including three tanks and a filtration system having a filter and a buffer tank.

As shown in FIG. 2, a vehicle wash system 110 is provided that is similar to vehicle wash system 10 of FIG. 1. Wash system 110 includes a buffer tank 130 positioned downstream of a filter 124 and upstream of nozzles 16, to store liquids 15 that have been oxidized by oxidizer system 22 and filtered by filter 124, creating filtered liquids 15B, and a series of tanks 120A, 120B, 120C to receive liquids and other material collected by a basin 118.

Filter 124 has a preferred tank volume of about 180 gallons and a flow rate of about 20-30 gallons of oxidized liquid 15 A per minute flowing there through when in a reclamation mode with liquid 15A flowing through reclamation loop 28. At 30 gallons per minute, this provides a filter tank volume to flow rate ratio of six minutes, allowing oxidized liquid six minutes to flow through filter 124. According to alternative embodiments, the ratio may be one minute, two minutes, four minutes, eight minutes, ten minutes, etc. When in a recirculation mode with liquid 15A flowing through recirculation loop 26, the flow rate of liquid 15A is about 80-85 gallons per minute.

Wash system 110 and other systems described herein, may include a flow path 250A that directs oxidized liquid 15A directly to basin 218. Junction 252 splits or divides oxidized water 15A so that a portion of oxidized liquids 15A travels to filter 124 and ultimately to nozzles 16 and another portion of oxidized liquids 15A bypasses filter 124 and nozzles 16.

Figure 3:
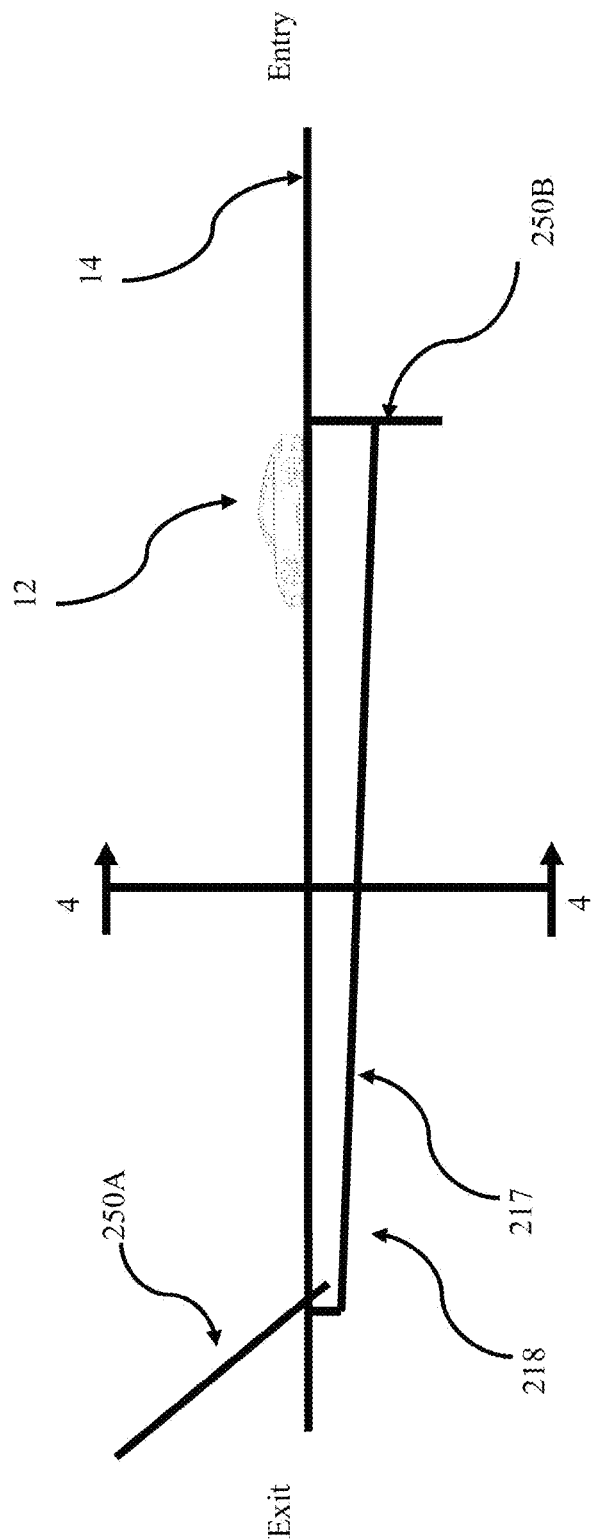
FIG. 3 is an enlarged view of an alternative embodiment basin showing a sloped basin.
Figure 4:
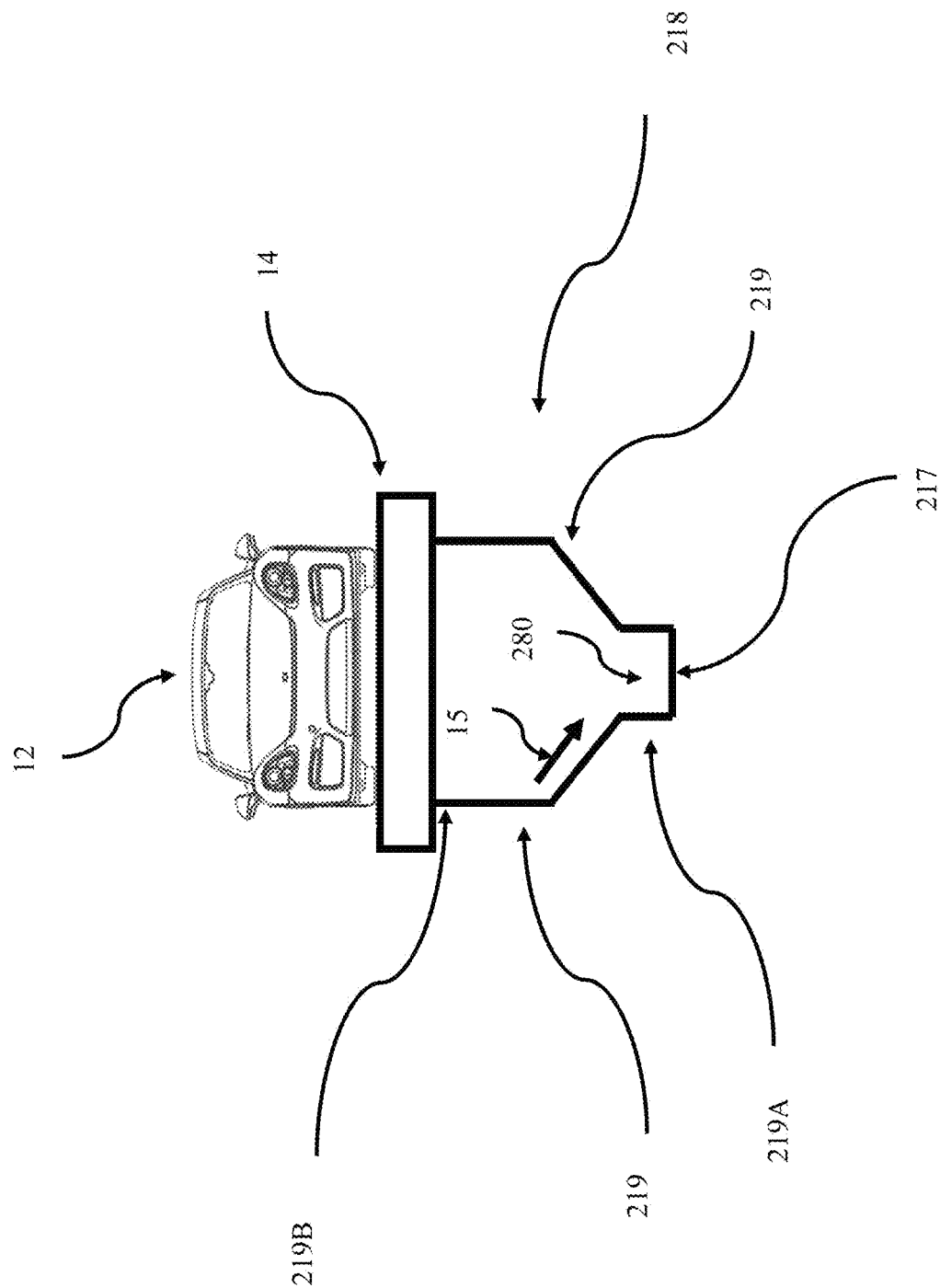
FIG. 4 is a cross-sectional view of the basin taken along line 4-4 of FIG. 3 showing tapered sides of the basin.

FIGS. 3 and 4 shows one embodiment of a basin 218 having a basin bottom 217 and basin sides 219. Basin bottom 217 is sloped to direct liquids 15 and materials, such as sand, dirt, etc. that fall into or are otherwise collected by basin 218 toward a basin outlet 250B. As shown in FIG. 4, conveyor 14 is a belt conveyor and basin 218 are about the same width or greater than the width of vehicle 12. Conveyor 14 is wider than basin 218 and each of conveyor 14 and basin 218 are substantially wider than one half of the width of vehicle 12. According to alternative embodiments of the present disclosure, conveyor 14 and basin 218 are other widths relative to vehicle 12, such as greater than one quarter of the width of vehicle 12, greater than three quarters of the width of vehicle 12, etc. According to another embodiment, conveyor 14 may be a chain conveyor with a width slightly wider than vehicle tires (see for example FIG. 8).

Basin sides 219 are tapered such that lower ends 219A of basin sides 219 are substantially closer together than upper ends 219B of sides 219. Lower ends 219A of sides 219 cooperate to define basin trough 280. According to basin 218, basin sides 219 include a tapered segment of the height of basin sides 219. According to other embodiments, basin sides 219 may be substantially tapered for the entire height. According to another embodiment tapered sides 219 are curved, semicircular, etc. When liquids 15 and materials are collected by basin 218, tapered basin sides 219 direct liquids 15 and materials into a basin trough 280 and down basin bottom 217. According to the present disclosure, basin trough 280 has a rectangular shape as shown. According to other embodiments, basin trough 280 may have curved sides, etc. As shown in FIG. 3, the height of basin 218 increase along the length of basin 218 from a shortest height on the vehicle exit end and a tallest height on the vehicle entry end. Tapered basin sides 219 preferably extend the entire length of basin 218.

Figure 5:
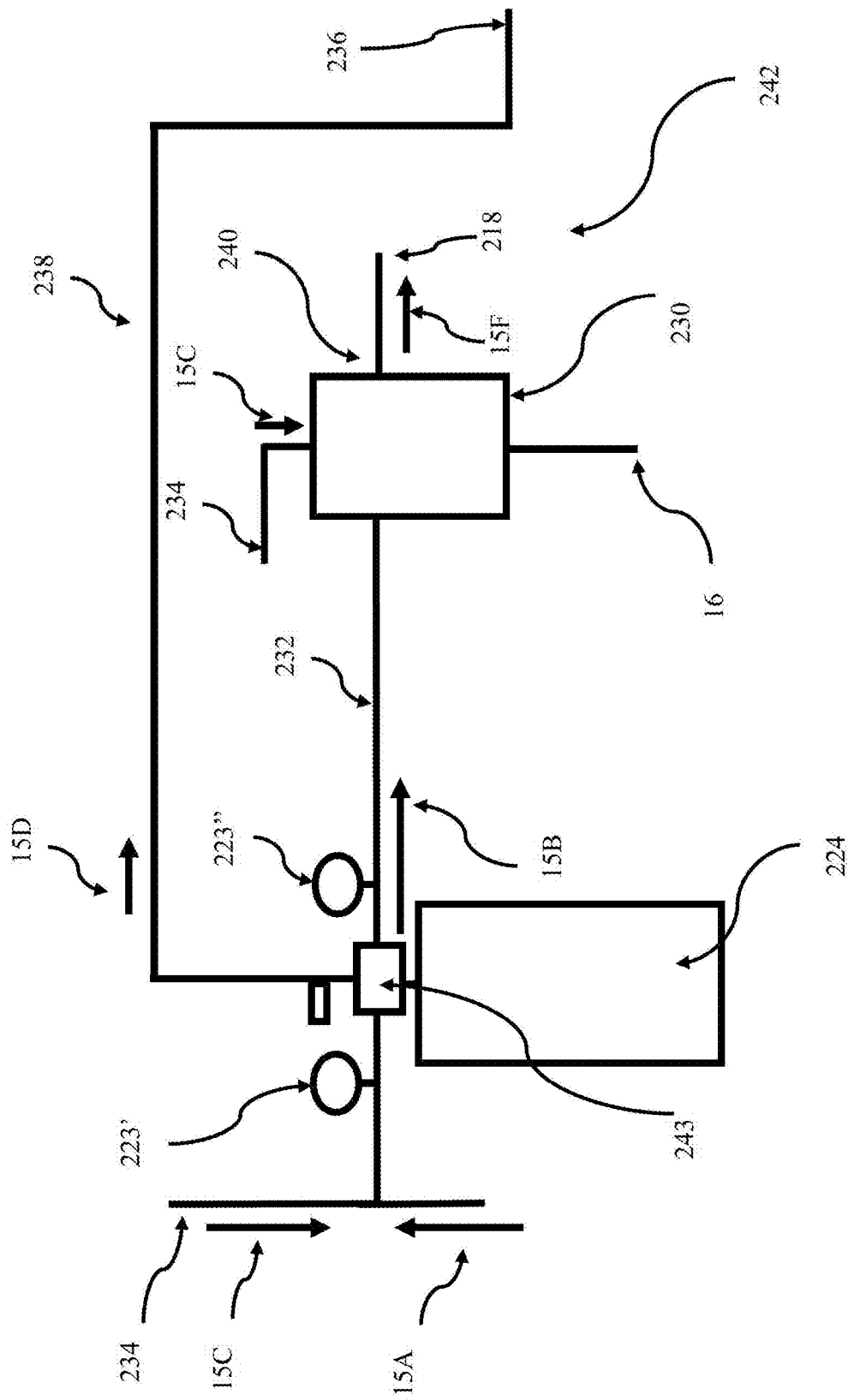
FIG. 5 is an enlarged view of an alternative embodiment filtration system showing a filter, a buffer tank, at least one municipal water feed, a municipal sewer drain, and a plurality of pressure gauges and switches.

FIG. 5 shows one embodiment of a filtration system 242 having a filter 224 and a buffer tank 230. Filter 224 removes materials from liquids 15, including neutrally buoyant materials, to create filtered liquids 15B. According to this filtration system 242 and other filtration systems, filter 224 may be a media-based particle filter and include at least two stratum of medium. Other embodiments of a filtration system may include a mechanical filter or a cyclonic filter. After leaving filter 224, filtered liquids 15B is directed to buffer tank 230 by pipes 232, which are substantially narrower than filter 224 and buffer tank 230. Pipes 232 also have a substantially lower volume than filter 224 and buffer tank 230. Buffer tank 230 stores filtered liquids 15B before directing filtered liquids 15B to nozzles 16.

Filtration system 242 also includes pressure gauges 223', 223". First pressure gauge 223' is positioned upstream of filter 224 to measure liquid pressure into filter 224. Second pressure gauge 223" is positioned downstream of filter 224 to measure liquid pressure leaving filter 220. If liquid pressure measured by second pressure gauge 223" is substantially lower than liquid pressure measured by first pressure gauge 223', liquids 15C from a municipal water feed 234 are directed into filter 224. Filtration system 242 also includes a filter head 243, which is activated when backwashing is initiated to reverse the flow direction liquids 15C from municipal water feed 234 through filter 224. When filter head 243 is activated, the reversed flow of liquids 15 through filter 224 removes foreign material from the media of filter 224, creating backwashed liquids 15D. After leaving filter 224, backwashed liquids 15D and materials are directed through a sand filter drain 238 to a municipal sewer 236. After the materials have been directed through filter drain 238, filter head 243 deactivates, the flow direction of liquids 15 through filter 224 resets, and the media of filter 224 stratifies. During backwashing, different sized media may mix as the backwash water disturbs and flushes materials from the media. When the backwash water is turned off, the different sized media stratifies with finer, denser media settling to the bottom of filter 224 and coarser, less dense media settling to the top of filter 224.

Filtration system 242 also includes a municipal water feed 234 to supply additional liquids 15C, such as water, to buffer tank 230 when the level of filtered liquids 15B becomes too low, and an overflow drain 240 directing overflow liquids 15E to municipal sewer 236 when the level of filtered liquids 15 become too high. Overflow drain 240 may also be positioned to skim oil and silicon from filtered liquids 15B in buffer tank 230. Overflow drain 240 may drain to municipal sewer 236 or may drain to basin 218. Components may be added or removed from filtration system 242. Buffer tank 230 may include one or more flow valves (not shown) that control the level of liquid 15B in buffer tank 230. One such float valve opens when tank 230 reaches a preferred minimum volume and allows municipal water into tank 230 as mentioned above.

Figure 6:
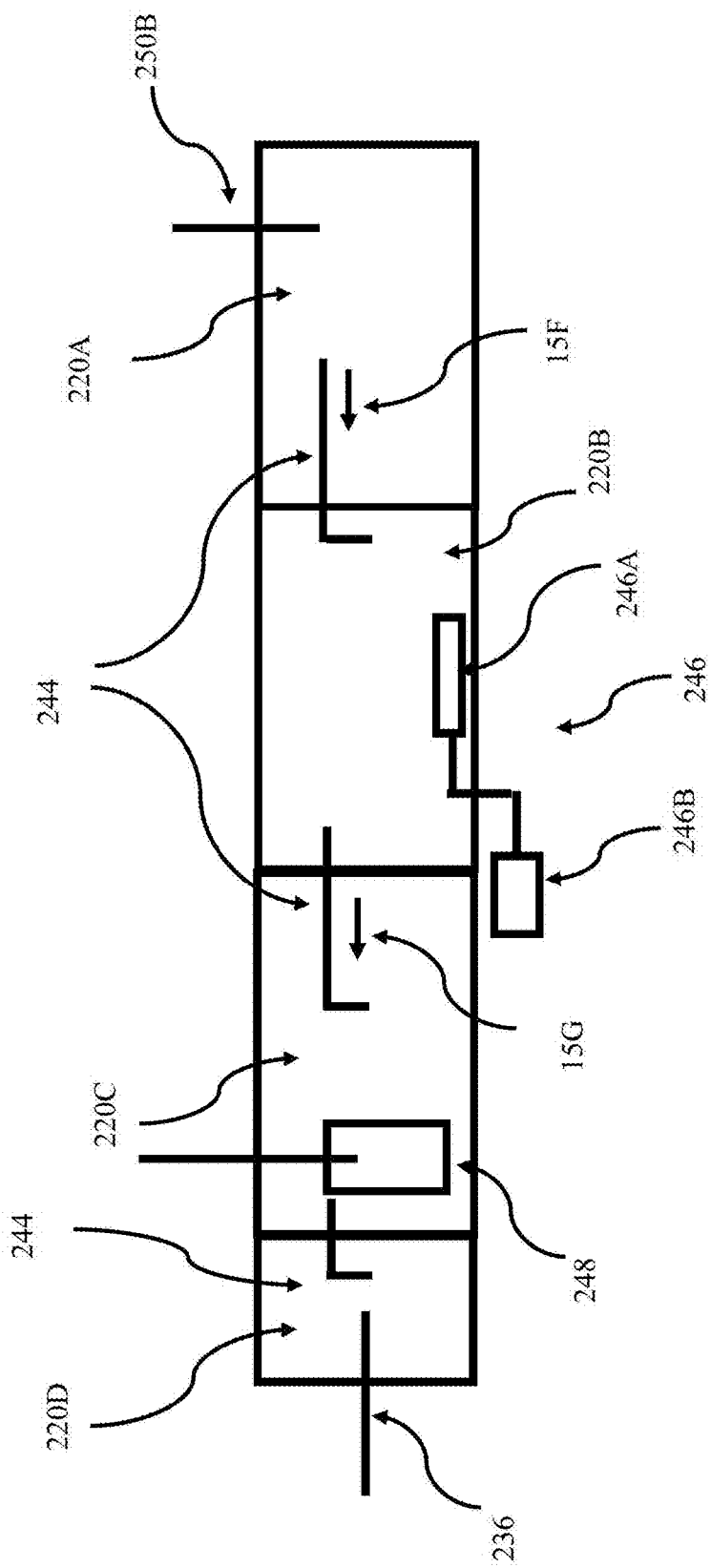
FIG. 6 is an enlarged view of an alternative embodiment filtration system showing additional details of the series of tanks and further showing a first tank having a water inlet, a second tank having an aerator, and a third tank having at least one pump.

FIG. 6 shows one embodiment of a series of tanks 220 including at least three tanks 220A, 220B, 220C. Substantially all liquids 15 is received by a first tank 220A through at least one inlet 250. First tank 220A is configured to allow much of the high density material, such as sand, dirt, etc., to settle to the bottom of liquids 15, creating clarified liquids 15F. Clarified liquids 15F are then directed to a second tank 220B through a liquid path 244'.

Second tank 220B may include at least one aerator 246 configured to introduce air (not shown) into clarified liquids 15F, increasing the dissolved oxygen in clarified liquids 15F. According to the present disclosure, at least one aerator 246 comprises a porous block 246A and an air compressor 246B. According to alternative embodiments, at least one aerator 246 may be a cascade aerator, a cone aerator, a slat and coke aerator, a draft aerator, a spray aerator, a pressure aerator, a centrifugal aerator, etc. According to the present disclosure, at least one aerator 246 produces bubbles with a surface area to volume ratio greater than three, such as microbubbles, nano-bubbles, etc., creating aerated liquids 15G. Aerated liquids 15G is then directed a third tank 220C through a liquid path 244" that includes at least one pump 248 to direct aerated liquids 15G out of series of tanks 220. According to alternative embodiments, at least one aerator 246 may be positioned in other tanks such as first tank 22A or third tank 220C.

Figure 7:
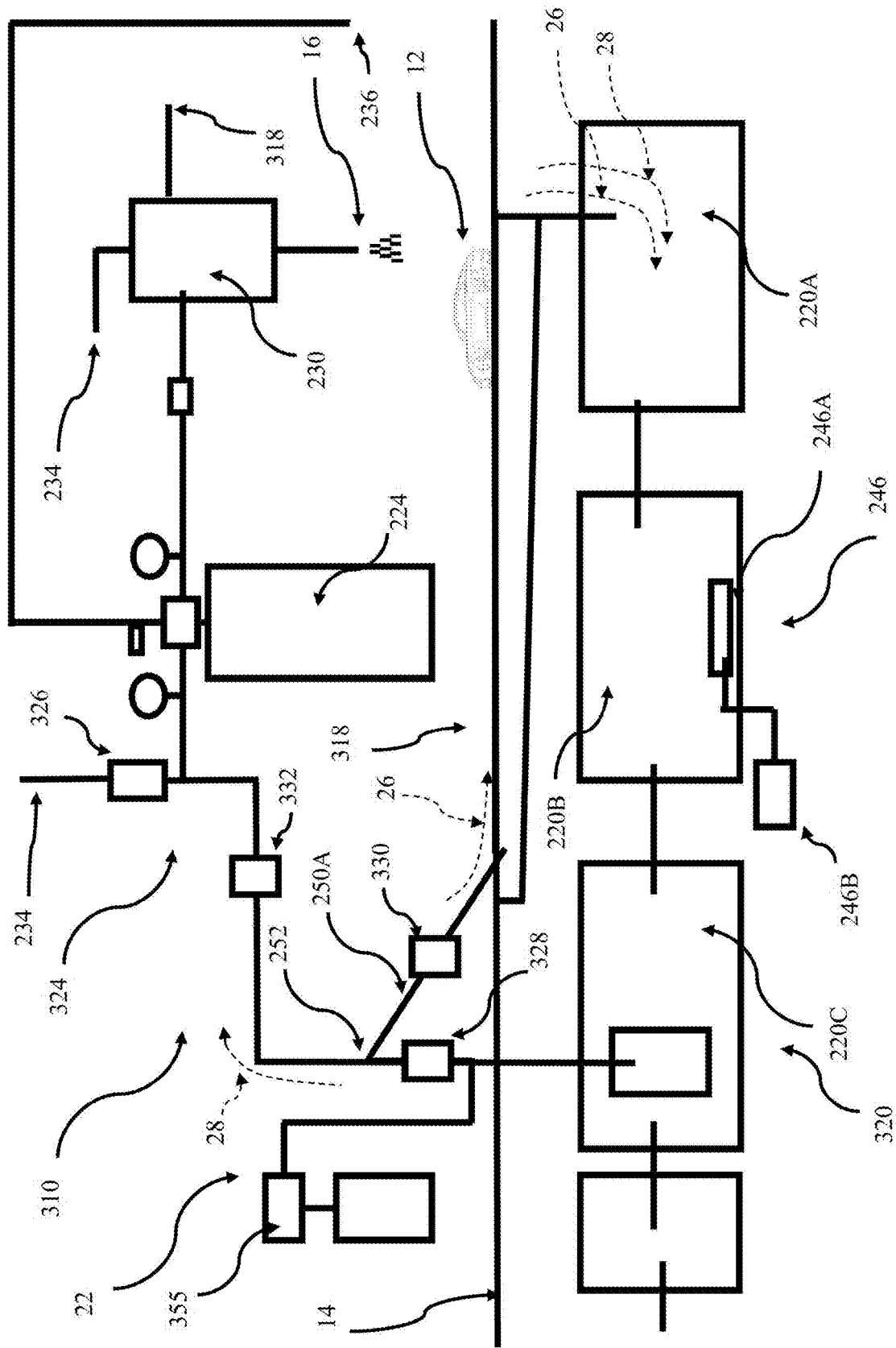
FIG. 7 is the schematic diagram of another vehicle wash system similar to the vehicle wash system of FIG. 1 showing the vehicle wash system with a basin similar to the basin of FIG. 3, a filtration system similar to the filtration system of FIG. 5, and a series of tanks similar to the series of tanks of FIG. 6.

Series of tanks 220 may further include an oil and sand separator tank 220D to remove a volume of oil and sand that has settled in liquids 15 stored in series of tanks 220. Oil and sand separator tank 220D drains to a municipal sewer 236. Series of tanks 220 may comprise individually walled tanks, as shown in FIGS. 2 and 7 or may comprise tanks separated by shared walls as shown in FIG. 6. Components may be added or removed from series of tanks 220.

As shown in FIG. 7, one embodiment of a vehicle wash system 310 is provided that is similar to wash system 10 and wash system 110. Vehicle wash system 310 includes a basin 318 that is similar to basin 218, a filtration system 324 that is similar to filtration system 242, and a series of tanks 320 that is similar to series of tanks 220. Wash system 310 includes conveyor system 14 to advance vehicles 12 through wash system 310, plurality of nozzles 16 that apply liquids 15 to vehicles 12 as they are advanced past nozzles 16 by conveyor system 14, oxidation system 22 that introduces one or more oxidizers into liquids 15, recirculation loop 26, and reclamation loop 28. According to alternative embodiments, at least one aerator 246 may be positioned elsewhere in recirculation loop and reclamation loop 26, 28, such as immediately upstream or downstream of oxidation system 22.

Control of the addition of municipal water 234 is provided by a valve 326. A flow switch 328 is provided to detect the flow of liquids 15A. If flow is not detected when flow should be occurring, the PLC will provide a warning. A valve 330 is provided to control the flow of liquids 15A directly to basin 318 when in the recirculation mode. A valve 332 is provided to control the flow of liquids 15A to filter 224 when in the reclamation mode. When in the recirculation mode, valve 330 is open and valve 332 is closed. When in the reclamation mode, valve 330 is closed and valve 332 is open.

Figure 8:
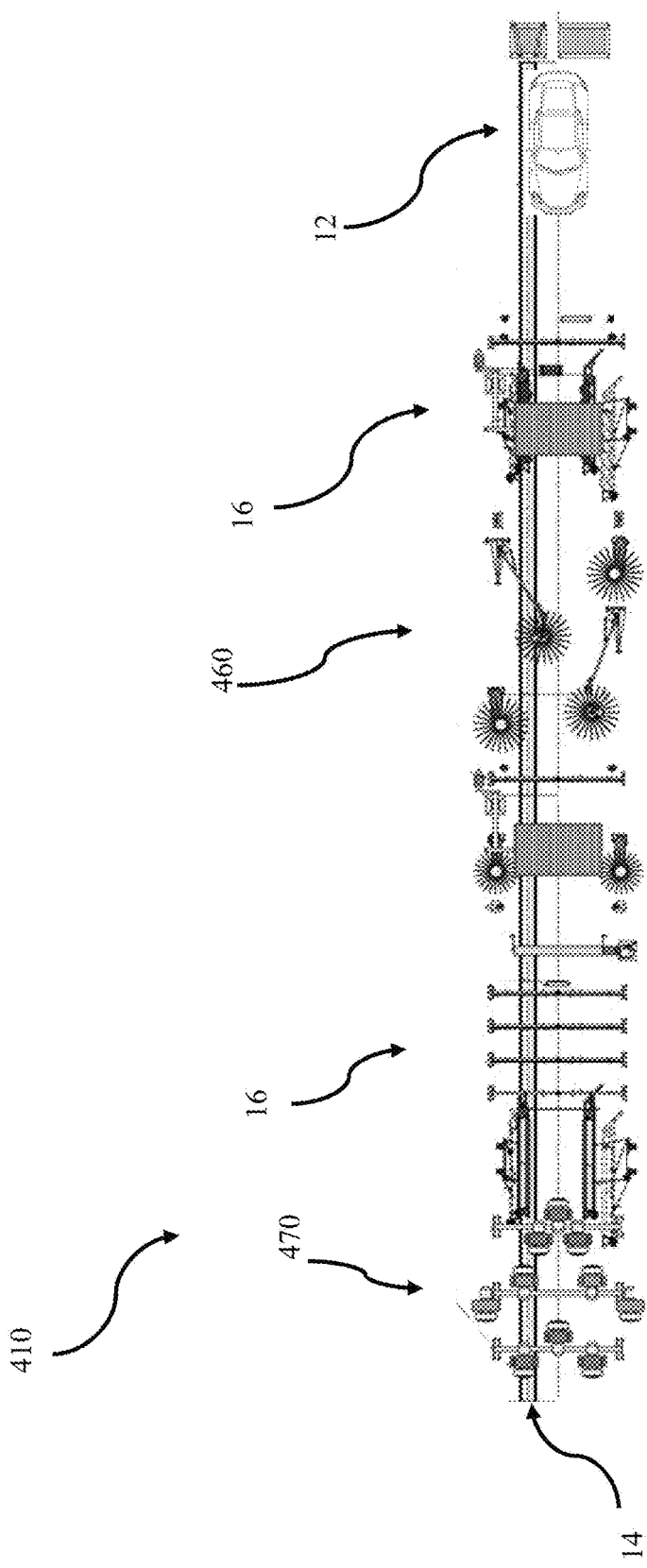
FIG. 8 is a top view of a vehicle wash system having a conveyor, nozzles, wraps, and air dryers.

As shown in FIG. 8, a vehicle wash system 410 is provided. Vehicle wash system 410 includes a conveyor system 14 to advance vehicle wash system 410, plurality of nozzles 16 to apply liquids and chemicals (not shown) to vehicles 12 as they advance past nozzles 16, plurality of wraps 460 that scrub vehicles 12 as they advance past wraps 460, and plurality of air dryers 470 that dry vehicles 12 as they advance past air dryers 470.

According to the present disclosure, oxidizer system 22, and other oxidizer systems discussed herein, the one or more oxidizers introduced into liquid 15 may be liquid oxidizer. The one or more oxidizers preferably have a half-life greater than one hour to allow for oxidizer to benefit substantially all of vehicle wash system 10, even during periods when a low volume of vehicles passes through vehicle wash system 10. To further facilitate benefitting substantially all of vehicle wash system 10, oxidizer system 22 preferably includes a dosing pump 355. While activated, dosing pump 355 continually doses metered amounts of oxidizer by filling the injector with a metered amount of oxidizer, which is then directed into liquid 15 by a piston (not shown) actuating at a metered rate. The one or more oxidizers are introduced to create oxidized liquid 15A and maintain dissolved oxygen saturation levels to keep a dissolved oxygen saturation at a level above which the hydrogen sulfide is created/released, for example, depending on the conditions, the level may be at least dissolved oxygen saturation levels may be maintained at 40%, 50%, 60%, 70%, 80%, 90%, etc. For example, liquid 15 may go anaerobic at low dissolved oxygen levels below 1.0 ppm dissolved oxygen, resulting in the creation/release of hydrogen sulfide. Liquid 15 may be fully saturated around 14 ppm dissolved oxygen at 0 degrees Fahrenheit to around 7.6 ppm dissolved oxygen at 86 degrees Fahrenheit.

Under anaerobic conditions (low levels of dissolved oxygen), sulfides cannot be oxidized so they combine with hydrogen to form hydrogen sulfide gas. This creates the "rotten egg" odor in wastewater. The formation of hydrogen sulfides is also dependent on the pH of the water with lower pH levels (<6.0) creating greater amounts of the hydrogen sulfide gas. In addition, oxygen is consumed by both the chemical oxygen demand (COD) and the biological oxygen demand (BOD).

According to the present disclosure, oxidizer system 22, and other oxidizer systems discussed herein, may include a programmable logic controller. The programmable logic controller (PLC) allows for automatic and manual adjustments of the introduction of oxidizer into liquids 15. The PLC may operate in a recirculation mode, a reclamation mode, and a high dosing mode with each mode providing a different rate of dosing/introduction of the liquid oxidizer into liquid 15 and controlling different flow paths through wash systems described herein. For example, in the recirculation mode, the PLC may introduce 0.20 ml per minute of 20% hydrogen peroxide per minute with a liquid flow rate of 85 gallons per minute; in the reclamation mode, the PLC may introduce 0.536 ml of 20% hydrogen peroxide per minute with a liquid flow rate of 30 gallons per minute; in the high dosing mode, the PLC may introduce 1.675 ml of 20% hydrogen peroxide per minute with a liquid flow rate of 30 gallons per minute; and a post-flush mode (used after filters 124, etc are back flushed), the PLC may introduce 1.34 ml of 20% hydrogen peroxide per minute with a liquid flow rate of 30 gallons per minute. The rate of oxidizer output in each mode is different. For example the rate of oxidizer output during the high dosing mode is 10 times the rate output during the recirculation mode. Ratios other than 10:1 may be provided, such as 5:1, 8:1, 12:1 20:1, etc. may be provided. The rate of oxidizer output during the high dosing mode is 2 times the rate output during the reclamation mode. Ratios other than 2:1 may be provided, such as 1.5:3:1, 4:1, 8:1, 12:1 20:1, etc. may be provided.

When in the recirculation mode, a valve(s) (not shown) controls the flow of oxidized liquid 15A to circulate liquid 15A through the recirculation loops, such as recirculation loop 26, without flowing through the reclamation loop, such as reclamation loop 28. When in the reclamation mode, the valve(s) control the flow of oxidized liquid 15A to circulate liquid 15A through the reclamation loops, such as reclamation loop 28, without flowing through the recirculation loop, such as recirculation loop 26. When in the high dosing mode, the valve(s) control the flow of oxidized liquid 15A to circulate liquid 15A through the reclamation loops, such as reclamation loop 28 to provide highly oxidized liquid 15A throughout the wash systems to stop anaerobic reactions that create hydrogen sulfide. During low vehicle volume operating times (rainy days, evenings, etc., recirculation mode and reclamation modes periodically runs to circulate oxidized liquid 15A throughout the systems. The systems are configured to detect when a vehicle hasn't been washed in 4 minutes (as detected by conveyor operation). If no vehicle has been washed during this time span, the systems cycles through the recirculation mode and reclamation modes until a vehicle is detected. For example, every 45 minutes during a slow time (i.e. no vehicles are being washed), the systems runs for 30 minutes in recirculation mode, then runs for 10 minutes in reclamation mode, and 5 minutes the system shuts down/goes into an off mode. When a vehicle enters the systems, the systems switch to the reclamation mode to supply liquids 15A for spraying the vehicle, etc.

According to one embodiment, the PLC includes maintenance screens monitoring readings supplied by at least one sensor 21, pressure gauges 223', 223". Maintenance screens may display readings supplied by other sensors measuring on/off cycles, pump hours, system faults, such as low flow, no flush, motor fault, etc. According to one embodiment, readings displayed by maintenance screens may be remote connection capable.

According to the present disclosure, aerator 246, and other aerators discussed herein, may introduce air bubbles with a diameter less than or equal to 2 mm into liquid 15. The 2 mm diameter air bubbles have a surface area to volume ratio of three/mm. 0.05 mm diameter air bubbles have a surface area to volume ratio of sixty/mm. In other embodiments, aerator 246 may include a sub-micron porous block (not shown). A 5 micron bubble will producing air bubbles with a surface area to volume ratio of 30,000 for a 5 micron porous block.

Air bubbles are introduced into liquid 15 to increase the efficiency of dissolved oxygen. Oxygen transfer is increased when bubbles stay in the solution longer and bubbles stay in the solution longer by reducing the bubble velocity to the surface by reducing the size of the bubble.

According to the present disclosure, at least one pump 248, and other pumps discussed herein, may include a grinder. At least one pump 248 and the grinder cooperate to allow at least one pump 248 can be positioned in series of tanks 220 such that material is pumped through recirculation loop 26 and reclamation loop 28. The grinder can be placed in the series of tanks 220 to prevent problems related to the loss of priming. The grinder can eliminate the need for pre-filters requiring routine maintenance as the absence of a pre-filter allows the pump 248 to ingest neutrally buoyant material, such as fibers, paper, etc. Neutrally buoyant materials are materials that have about the same density as liquid 15A, such as materials that are within 15% of the density of liquid 15A.

According to the present disclosure, basin 18, and other basins discussed herein, are self-cleaning. Recirculation loop 26 provides a high flow of oxidized liquids 15A below conveyor 14. Tapered basin sides 219 and basin trough 280 cooperate to increase the flow rate and turbulence of liquids 15 as liquids 15 travel down sloped basin bottom 217. The preferred velocity of liquids 15 may be between 2 and 4 m/s to allow for effective self-cleaning without erosion of the basin. The preferred flow rate of liquids 15A may also be 85 gallons per min for effective cleaning without erosion of the basin.

Those having ordinary skill in the art will recognize that numerous modifications can be made to the specific implementations described above. The implementations should not be limited to the particular limitations described. Other implementations may be possible.

I claim:

1. A vehicle wash system, comprising:
   a vehicle conveyor configured to advance vehicles,
   a liquid loop including
   a plurality of nozzles configured to apply liquids to vehicles advanced past the plurality of nozzles by the vehicle conveyor,
   a basin positioned to collect liquids applied to the vehicles by the plurality of nozzles,
   at least one tank positioned to receive the liquids after application to the vehicles by the plurality of nozzles,
   at least one pump positioned in the at least one tank and configured to pump liquids to the plurality of nozzles, the at least one pump being configured to pump the liquids from the at least one tank, and
   a filtration system positioned to remove neutrally buoyant material from the liquid loop, wherein the vehicle wash system has a first mode with the liquid flowing through the filter and a second mode with the liquid bypassing the filter.

2. The vehicle wash system of claim 1, further comprising a backwash water source separate from the liquid loop to flush the neutrally buoyant material in the filtration system.

3. The vehicle wash system of claim 2, further comprising an outlet positioned to discharge the neutrally buoyant material flushed from the filtration system into a municipal sanitary sewer system.

4. The vehicle wash system of claim 2, wherein the backwash water source is municipal water.

5. The vehicle wash system of claim 1, further comprising an oxidizer system in fluid communication with the liquids moved by the at least one pump to introduce oxidizer into the liquid, the oxidizer system being positioned upstream of the filtration system.

6. The vehicle wash system of claim 4, wherein the oxidizer is a liquid oxidizer.

7. The vehicle wash system of claim 4, wherein the oxidizer is metered and adjustable.

8. The vehicle wash system of claim 4, wherein the oxidizer has a half-life greater than one hour.

9. The vehicle wash system of claim 1, wherein the at least one tank includes at least first, second, and third tanks in series, substantially all water in the loop flowing through the basin into the first tank to the second tank to the third tank.

10. The vehicle wash system of claim 1, further comprising an aeration system positioned in the at least one tank to infuse the liquid with air bubbles with a surface area to volume ratio greater than three.

11. A vehicle wash system, comprising:
    a plurality of nozzles configured to apply liquids to vehicles,
    a vehicle conveyor configured to advance vehicles past the plurality of nozzles,
    at least one pump configured to pump liquids to the plurality of nozzles, the at least one pump being configured to pump the liquids from at least one tank positioned to receive the liquids after application to the vehicles by the plurality of nozzles,
    an oxidizer system in fluid communication with the liquids to introduce oxidizer into the liquid, and a media-based filter positioned downstream of the oxidizer system to filter material from the liquid, and
    a buffer tank positioned downstream of the media-based filter, the buffer tank being positioned upstream of the plurality of nozzles.

12. The vehicle wash system of claim 11, wherein the media-based filter is flushed using a municipal water source.

13. The vehicle wash system of claim 11, wherein the media-based filter includes stratified media.

14. The vehicle wash system of claim 11, wherein the media-based filter has a volume, the at least one pump provides a flow rate through the media-based filter at a flow rate, and a ratio of the volume to flow rate is at least one minute.

15. A vehicle wash system, comprising:
    a plurality of nozzles configured to apply liquids to vehicles,
    a vehicle conveyor configured to advance vehicles past the plurality of nozzles,
    at least one pump configured to pump liquids to the plurality of nozzles, the at least one pump being configured to pump the liquids from at least one tank positioned to receive the liquids after application to the vehicles by the plurality of nozzles,
    an adjustable oxidizer system in fluid communication with the liquids moved by the at least one pump to introduce a metered amount of oxidizer into the liquid, and the adjustable oxidizer system including a feedback control loop having a sensor configured to measure a characteristic indicative of a condition of the liquid and the adjustable oxidizer system adjusting the introduction of oxidizer into the liquids based on the characteristic.

16. The vehicle wash system of claim 15, wherein the oxidizer system has a reclamation mode in which oxidized liquid is directed by the at least one pump to the plurality nozzles and a recirculation mode in which oxidized liquid is directed to an outlet with the oxidized liquid bypassing the plurality of nozzles.

17. The vehicle wash system of claim 16, wherein the output of oxidizer from the oxidizer system is different based on the mode.

18. The vehicle wash system of claim 16, wherein the oxidizer system has an odor eliminator mode and a ratio of the liquid oxidizer output from oxidizer system in the odor eliminator mode to the liquid oxidizer output from oxidizer system in at least one of the recirculation mode and reclamation modes is at least 2:1.

19. The vehicle wash system of claim 15, wherein the oxidizer is a liquid oxidizer.

20. The vehicle wash system of claim 15, further comprising a filtration system positioned downstream of the oxidizer system to remove material from the liquid.

21. A vehicle wash system, comprising:
    a plurality of nozzles configured to apply liquids to vehicles,
    a vehicle conveyor configured to advance vehicles past the plurality of nozzles,
    first, second, and third tanks in series positioned to receive the liquids after application to the vehicles by the plurality of nozzles, at least one pump configured to pump liquids to the plurality of nozzles, the at least one pump being configured to pump the liquids from at least one of the first, second, and third tanks, and an oxidizer system in fluid communication with the liquids moved by the at least one pump to introduce oxidizer into the liquids to create oxidized liquid, substantially all oxidized liquid flowing through the first tank to the second tank to the third tank.

22. The vehicle wash system of claim 21, wherein a portion of the oxidized liquid flows to the nozzles prior to entering the first tank.

23. The vehicle wash system of claim 21, further comprising a junction receiving the oxidized liquid and dividing the oxidized liquid into a first portion directed to the plurality of nozzles and a second portion directed to the first tank.

24. The vehicle wash system of claim 21, wherein the oxidizer is metered and adjustable.

25. The vehicle wash system of claim 21, wherein the oxidizer is a liquid oxidizer.

26. The vehicle wash system of claim 21, wherein the oxidizer has a half-life of greater than greater than one hour into the liquid.

27. The vehicle wash system of claim 21, further comprising an aerator positioned in the second tank to introduce air bubbles with a surface area to volume ratio of greater than three.

* * * * *